US012002637B2

(12) United States Patent
Wang et al.

(10) Patent No.: US 12,002,637 B2
(45) Date of Patent: Jun. 4, 2024

(54) KEYBOARD AND KEY STRUCTURE CAPABLE OF DISPLAYING INSTANT IMAGE

(71) Applicant: ELGATO IDISPLAY LIMITED, New Taipei (TW)

(72) Inventors: Ming-Hung Wang, New Taipei (TW); Chia-Hsin Tsai, New Taipei (TW)

(73) Assignee: ELGATO IDISPLAY LIMITED, New Taipei (TW)

( * ) Notice: Subject to any disclaimer, the term of this patent is extended or adjusted under 35 U.S.C. 154(b) by 0 days.

(21) Appl. No.: 17/939,982

(22) Filed: Sep. 8, 2022

(65) Prior Publication Data

US 2024/0087823 A1 Mar. 14, 2024

(51) Int. Cl.
*H01H 3/12* (2006.01)
*G06F 3/02* (2006.01)
*H01H 13/705* (2006.01)

(52) U.S. Cl.
CPC ........... *H01H 3/125* (2013.01); *G06F 3/0219* (2013.01); *H01H 13/705* (2013.01); *H01H 2215/004* (2013.01); *H01H 2215/044* (2013.01); *H01H 2219/0026* (2013.01)

(58) Field of Classification Search
CPC ................. H01H 3/125; H01H 13/705; H01H 2215/004; H01H 2215/044; H01H 2219/0026; H01H 3/12; H01H 13/023; H01H 13/14; H01H 13/70; H01H 13/7065; H01H 13/83; H01H 2219/03; G06F 3/0219; G06F 3/02
See application file for complete search history.

(56) References Cited

U.S. PATENT DOCUMENTS

| 6,183,150 | B1 * | 2/2001 | Kao | H01H 3/125 200/344 |
| 6,706,986 | B2 * | 3/2004 | Hsu | H01H 3/125 200/344 |
| 10,796,861 | B2 * | 10/2020 | Chen | H01H 13/14 |
| 2011/0268487 | A1 * | 11/2011 | Larsen | G06F 3/0202 400/490 |
| 2022/0367130 | A1 * | 11/2022 | Chen | H01H 13/86 |

FOREIGN PATENT DOCUMENTS

| TW | 339876 U | 9/1998 |
| TW | M511075 U | 10/2015 |

* cited by examiner

*Primary Examiner* — Lheiren Mae A Caroc
(74) *Attorney, Agent, or Firm* — Li & Cai Intellectual Property Office

(57) ABSTRACT

A keyboard and a key structure capable of displaying instant image thereof are provided. The key structure includes a display unit, a circuit membrane, an elastic member, a key seat, a first supporting frame, a second supporting frame, and a translucent keycap. The first supporting frame has two first arms and two axle portions. The ends of the first arms are slidably disposed on an accommodation portion of the key seat. The second supporting frame has two second arms and two linking holes. The ends of the second arms are pivotally connected to the accommodation portion. The linking hole is elongated-shaped. When the translucent keycap is not pressed, the axle portion abuts against one hole-end of the linking hole. When the translucent keycap is pressed, the axle portion abuts against another one hole-end of the linking hole.

8 Claims, 8 Drawing Sheets

KEYBOARD AND KEY STRUCTURE CAPABLE OF DISPLAYING INSTANT IMAGE

CROSS-REFERENCE TO RELATED PATENT APPLICATION

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a keyboard and a key structure capable of displaying an instant image, and more particularly to a keyboard and key structure having an elastic dome at one side of a keycap for allowing an underneath displaying unit to show an image upward to a user through the keycap.

BACKGROUND OF THE DISCLOSURE

A conventional scissor-type mechanism of a keyboard has two supporting frames which are arranged in a crossed manner. One of the supporting frames has a top end pivotally connected to a bottom of the keycap, and a bottom end slidably disposed on a baseplate. The other one of the supporting frames has a top end slidably arranged to the bottom of the keycap, and a bottom end pivotally connected to the baseplate. In addition, cross portions of the two supporting frames are also pivotally connected to each other. The abovementioned "pivotally" indicates a connection that only allows a rotation to be performed, and does not allow a movement relative to the keycap. Further, an elastic dome is disposed underneath a center of the keycap.

The abovementioned key structure does not allow a light or an image to penetrate upward through a bottom of the keycap to a top surface of the keycap. In addition, since the cross portion of the two supporting frames is pivotally connected to each other, the interactive connection between the supporting frames is restricted much more. Furthermore, when a user presses on a corner of a keycap, the keycap is easily titled and is not stably lowered, which affects a tactile feeling response for an operating of a user.

To provide a function of upward lighting or image displaying for a keycap, in an existing way, the elastic dome is arranged at one side of the keycap, and the keycap is made of a transparent material. However, when the user applies a force on the keycap, the elastic force of the elastic dome is exerted to one side of the keycap. Thus, the keycap having the currently available scissor-type mechanism may receive non-uniform pressure and be tilted. In addition, each of the supporting frames of the conventional scissor-type mechanism is ring-shaped, and the bottom of the supporting frames blocks certain portions of light or image.

Therefore, how to improve the keycap structure to display an instant image and overcome the abovementioned shortages has become an issue to be addressed in the relevant field.

SUMMARY OF THE DISCLOSURE

In response to the above-referenced technical inadequacies, the present disclosure provides a key structure capable of displaying an instant image so that problems of a non-uniform pressure on a keycap and the keycap being tilted when the keycap is pressed can be addressed, such that the keycap can be stably lowered during a keying stroke.

In one aspect, the present disclosure provides a key structure capable of displaying an instant image, which includes a display unit, a key seat disposed above the display unit, a first supporting frame, a second supporting frame, and a translucent keycap. The key seat forms an accommodation portion that is hollow. The first supporting frame has two first arms, and two axle portions. Each of the first arms has one of the axle portions, and each of the first arms has a bottom end slidably disposed on the accommodation portion. The second supporting frame has two second arms, and two linking holes. The second supporting frame and the first supporting frame are arranged in a crossed manner. Each of the second arms has one of the linking holes formed thereon. Each of the second arms has a bottom end pivotally connected to the accommodation portion. Each of the linking holes is elongated-shaped and has two hole-ends, and the two axle portions of the first arms are slidably disposed in the two linking holes respectively. A width of each of the linking holes along an elongated direction of each of the second arms is larger than a height of each of the linking holes along a direction perpendicular to the elongated direction of each of the second arms. A top end of the first supporting frame and a top end of the second supporting frame are slidably connected to two sides of the translucent keycap, respectively. An image information of the display unit is shown through the accommodation portion and the translucent keycap so as to be shown outside. When the translucent keycap is not pressed, the two axle portions of the first arms abut against one of the two hole-ends of each of the linking holes, respectively. When the translucent keycap is pressed, the two axle portions of the first arms abut against the other one of the two hole-ends of each of the linking holes.

In another aspect, the present disclosure provides a keyboard, which includes at least one key structure capable of displaying an instant image. The key structure capable of displaying instant image includes a display unit, a key seat disposed above the display unit, a first supporting frame, a second supporting frame, and a translucent keycap. The key seat forms a hollow accommodation portion. The first supporting frame has two first arms and two axle portions. Each of the first arms has one of the axle portions, and each of the first arms has a bottom end slidably disposed on the accommodation portion. The second supporting frame has two second arms, and two linking holes. The second supporting frame and the first supporting frame are arranged in a crossed manner. Each of the second arms has one of the linking holes formed thereon. Each of the second arms has a bottom end pivotally connected to the accommodation portion. Each of the linking holes is elongated-shaped and has two hole-ends, and the two axle portions of the first arms are slidably disposed in the two linking holes of the second arms respectively. A width of each of the linking holes along an elongated direction of each of the second arms is larger than a height of each of the linking holes along a direction perpendicular to the elongated direction of each of the second arms. A top end of the first supporting frame and a top end of the second supporting frame are slidably connected to two sides of the translucent keycap, respectively.

An image information of the display unit is shown through the accommodation portion and the translucent keycap so as to be shown outside. When the translucent keycap is not pressed, the two axle portions of the first aims each abut against one of the hole-ends of each of the two linking holes, respectively. When the translucent keycap is pressed, the two axle portions of the first aims each abut against the other one of the two hole-ends of each of the linking holes.

Therefore, in the key structure capable of displaying an instant image provided by the present disclosure, by virtue of "a top end of the first supporting frame and a top end of the second supporting frame being slidably connected to two sides of the translucent keycap," the translucent keycap can be prevented from tilting caused by rotation.

In addition, by virtue of "the linking hole being elongated-shaped with two hole-ends", "the two axle portions of the first arms each being slidably disposed in the two linking holes of the second arms, respectively", and "a width of each of the linking holes along an elongated direction of each of the second arms being larger than a height of each of the linking holes along a direction perpendicular to the elongated direction of each of the second arms," when the translucent keycap is pressed in a downward keying stroke, the elongated-shaped linking hole can allow the first arms to smoothly slide in a lateral direction and gradually be lowered down, so that the translucent keycap is stably supported in the downward keying stroke. Therefore, a stable and non-tilted pressing tactile feeling can be provided for users.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
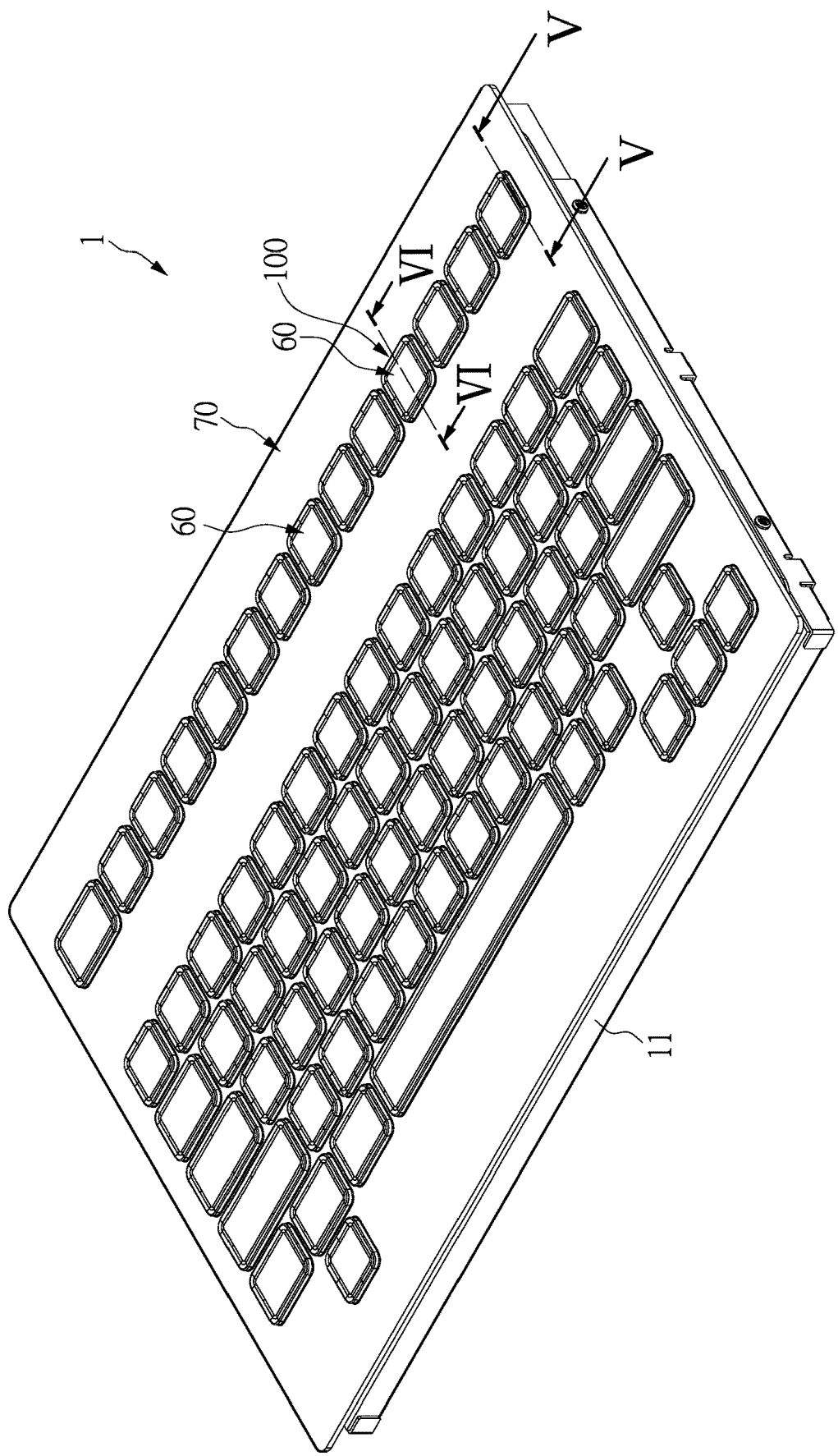
FIG. 1 is a perspective view of a keycap of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
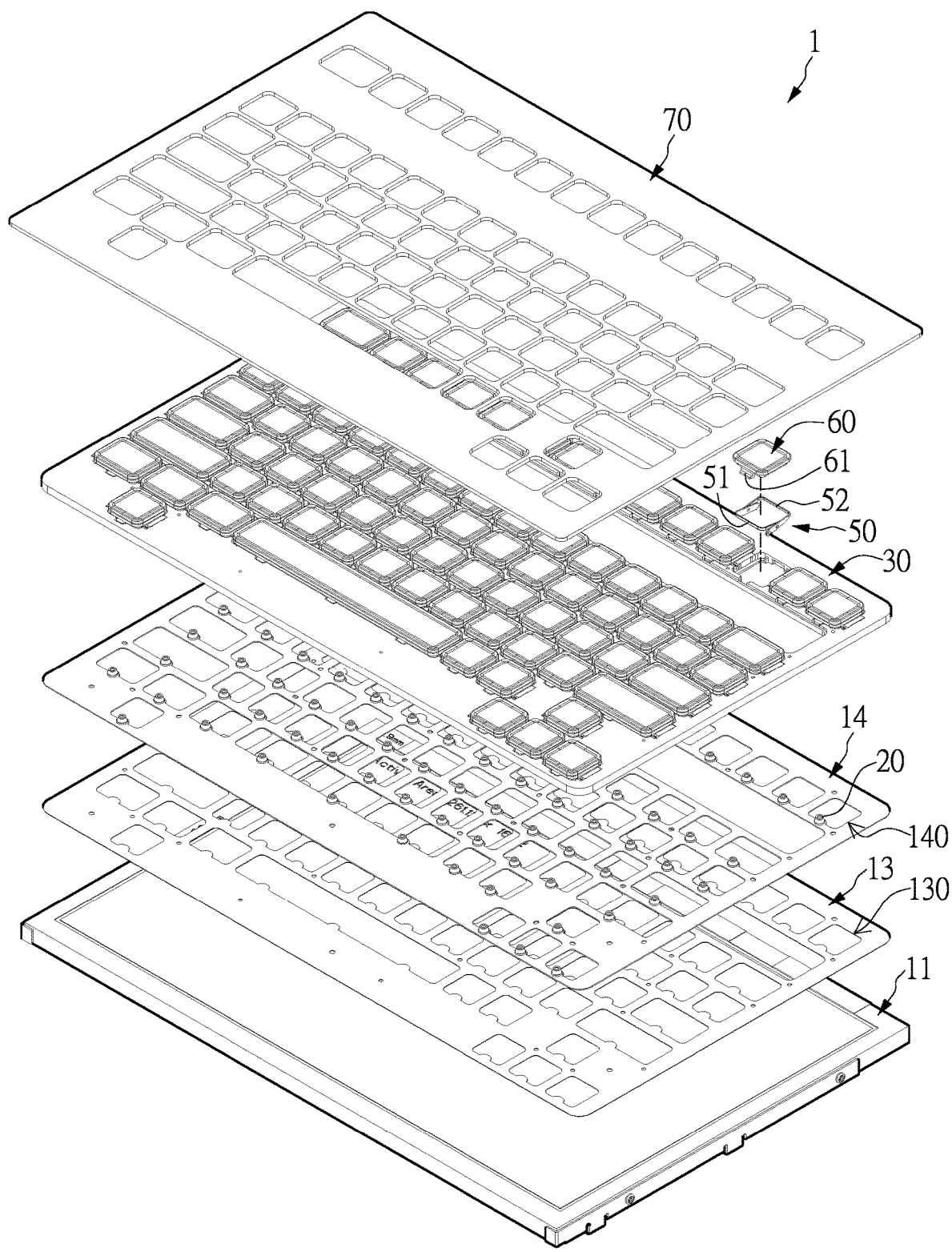
FIG. 2 is an exploded perspective view of the keycap of the present disclosure.

Referring to FIG. 1 to FIG. 2, the present disclosure provides a keyboard 1, which includes a plurality of key structures (or called as key structures 100) capable of displaying instant images. The keyboard 1 further includes a display unit 11, a retaining plate 13, a circuit membrane 14, a plurality of elastic members 20, a key seat 30, a plurality of supporting units 50, a plurality of translucent keycaps 60, and a covering lid 70. The display unit 11 may be an LCD Monitor, but the present disclosure is not limited thereto. The retaining plate 13 has a plurality of first through holes 130 formed thereon. The circuit membrane 14 is disposed above the display unit 11. The circuit membrane 14 has a plurality of membrane holes 140, and a plurality of conductive portions 142. The conductive portions 142 respectively protrude inward from one side of the membrane holes 140. The shape of the membrane hole 140 corresponds with the shape of the first through hole 130. The image information of the display unit 11 can pass through the first through hole 130, the membrane hole 140, and the key seat 30, and then penetrates the translucent keycap 60 so as to be shown outside. However, the present disclosure is not limited thereto, and the circuit membrane 14 can be without the membrane holes 140. For example, an uppermost layer of the circuit membrane 14 can be translucent without any through holes. In one aspect, such arrangement can prevent dust, while the image information of the display unit 11 still can penetrate upward.

Figure 3:
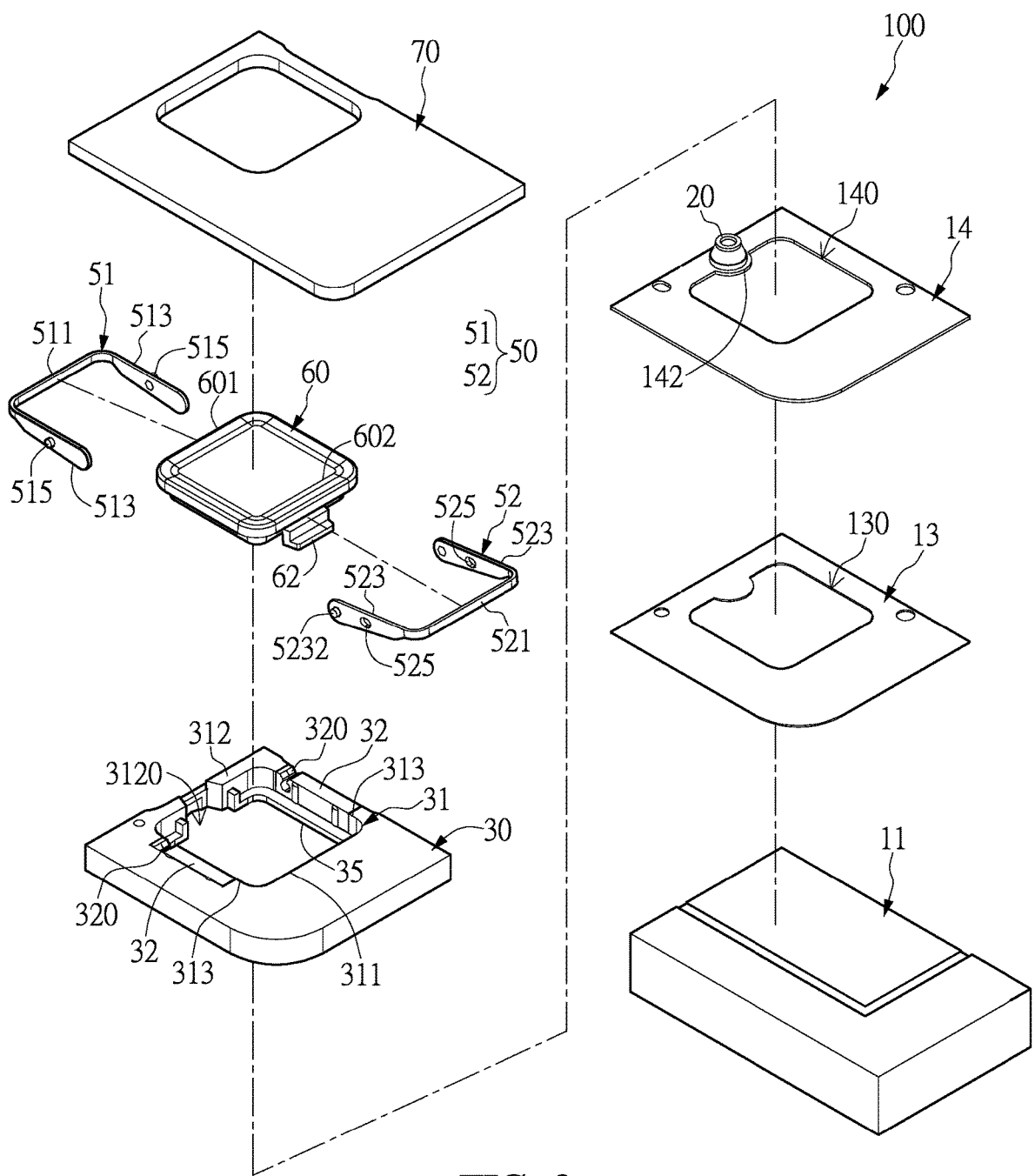
FIG. 3 is an exploded perspective view of a key structure of the present disclosure.
Figure 4:
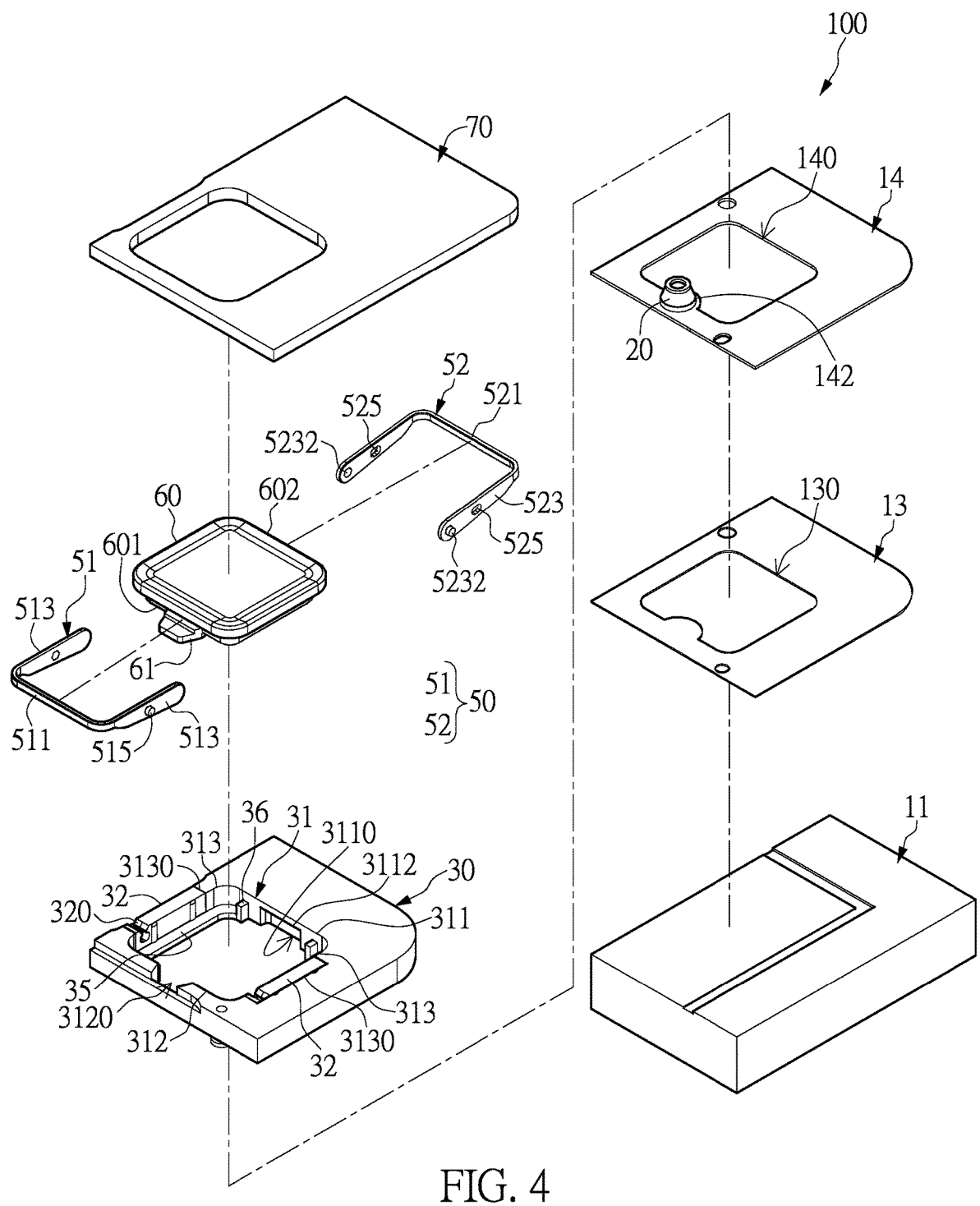
FIG. 4 is another exploded perspective view of the key structure of the present disclosure.
Figure 5:
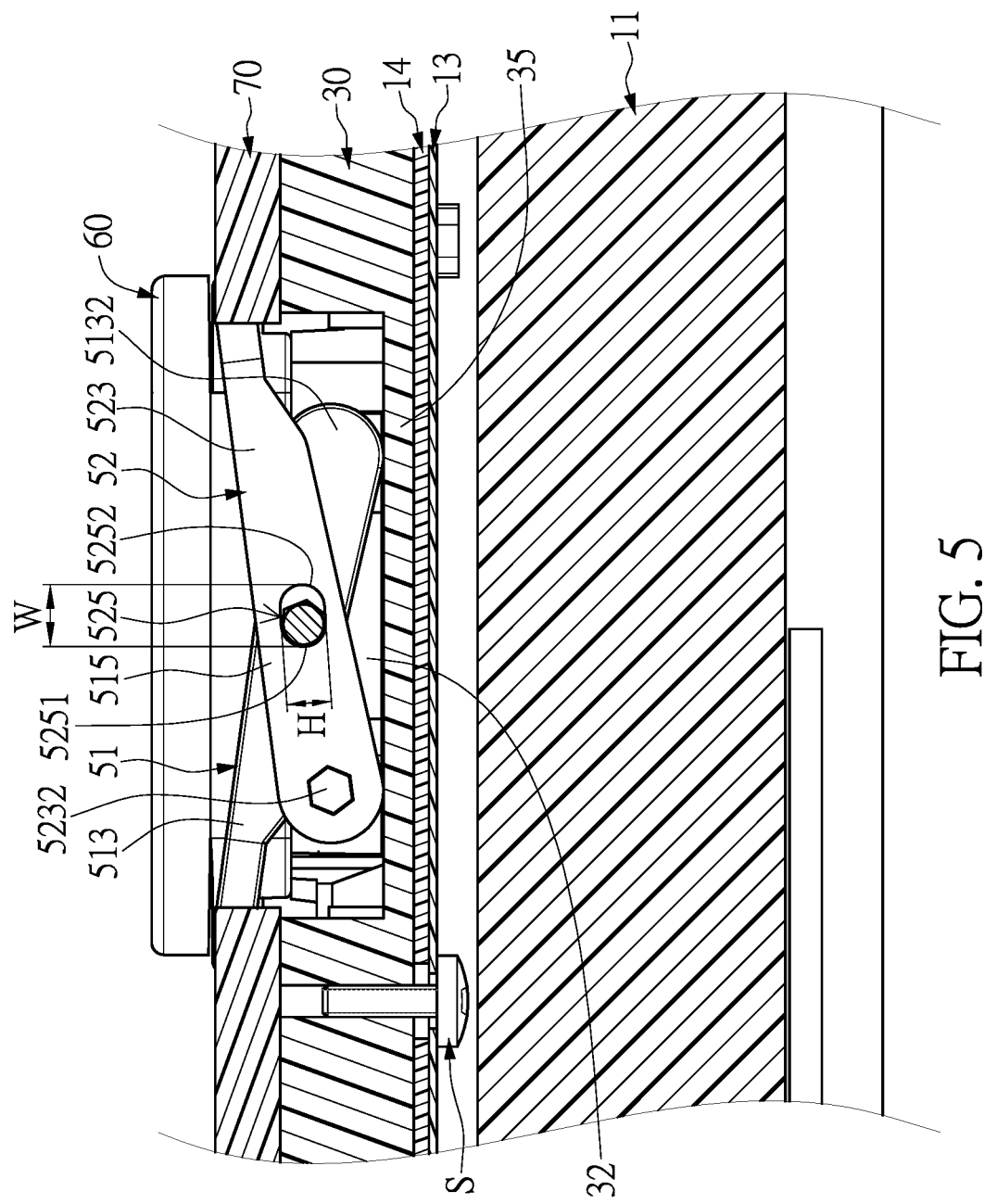
FIG. 5 is a cross-sectional view of the key structure not being pressed and along line V-V of FIG. 1 of the present disclosure.

Referring to FIG. 3 and FIG. 4, the elastic members 20 are respectively disposed on the conductive portions 142. When one of the translucent keycaps 60 is pressed, a circuitry of a corresponding one of the conductive portions 142 is pressed by one of the elastic members 20 to provide a conductive signal. The elastic members 20 can be separated, or can be integrally formed in a one-piece structure. The shape of the one-piece structure can correspond to that of the circuit membrane 14. In this embodiment, the elastic member can be a rubber dome that provides an elastic force to the keycap for recovering the keycap to an original position, and can downwardly and conductively connected to the conductive portion 142 of the circuit membrane 14. However, the present disclosure is not limited thereto. The elastic member also can be other elements, such as a spring, or a metal dome, which can enable the keycap to be recovered to an original position. In addition, the present disclosure is not limited to use the elastic member to conduct a signal. In the present disclosure, a protrusion downward from the keycap can be used to be conductively connected with the conductive portion 142 of the circuit membrane 14. The retaining plate 13 is screwed upward to and is positioned to the circuit membrane 14 and the key seat 30 from a bottom of the retaining plate 13 by screws S (as shown in FIG. 5), so as to provide a supporting force. However, the present disclosure is not limited to the aforementioned manner of conductive connection. For instance, the elastic member 20 can directly press on a top surface of the display unit 11 to form a turn-on state.

The following introduces one single key structure 100 as an exemplary example. The key structure 100 includes a display unit 11. The circuit membrane 14 is disposed above the display unit 11. The elastic member 20 is disposed on the circuit membrane 14. The key seat 30 is disposed on the circuit membrane 14, the supporting units 50, and the translucent keycap 60. The key seat 30 forms a hollow accommodation portion 31 which allows the image of the display unit 11 to pass through. The elastic member 20 is close to one side of the accommodation portion 31. The supporting unit 50 includes a first supporting frame 51, and a second supporting frame 52.

In this embodiment, the first supporting frame 51 and the second supporting frame 52 are substantially U-shaped. The first supporting frame 51 and the second supporting frame 52 are assembled in a crossed manner Bottoms of the supporting frames that are U-shaped do not block the image of the display unit 11. In detail, the first supporting frame 51 has a first traversing bar 511, two first arms 513, and two axle portions 515. The two first arms 513 are connected to two ends of the first traversing bar 511, respectively. Each of the first arms 513 has one of the axle portions 515. The bottom ends 5132 of the two first arms 513 are slidably disposed on the accommodation portion 31. The second supporting frame 52 has a second traversing bar 521, two second arms 523, and two linking holes 525. The two second arms 523 are connected to two ends of the second traversing bar 521, respectively. Each of the second arms 523 has one of the linking holes 525 formed thereon. The two bottom ends of the two second arms 523 are pivotally connected to the accommodation portion 31 at a fixed position. In other words, the two bottom ends of the two second arms 523 are pivotally connected to two sides of the accommodation portion 31, respectively. In this embodiment, the first supporting frame 51 and the second supporting frame 52 can be metal pieces which are produced by stamping. The axle portion 515 can be another element that is connected to the first arms 513. However, the present disclosure is not limited thereto. The first supporting frame 51 can be a one-piece element that is integrally-formed. In other words, the axle portions 515 are integrally formed with the first supporting frame 51. For example, the first supporting frame 51 and the axle portion 515 can be a unitary metal piece formed by stamping. The axle portion 515 partially protrudes outside from the first arms 513 by stamping. In other embodiments, for example, the first supporting frame 51 and the second supporting frame 52 can be formed by plastic injection.

One of the characteristics of this embodiment is that, the linking hole 525 is elongated-shaped. The two axle portions 515 of the first arms 513 are slidably disposed in the two linking holes 525 of the second arms 523, respectively. As shown in FIG. 5, in detail, the linking hole 525 is capsule-shaped, or ellipse-shaped. A width W of the linking hole 525 along an elongated direction of the second arm 523 is larger than a height H of the linking hole 525 along a direction perpendicular to the elongated direction of the second arm 523.

Figure 6:
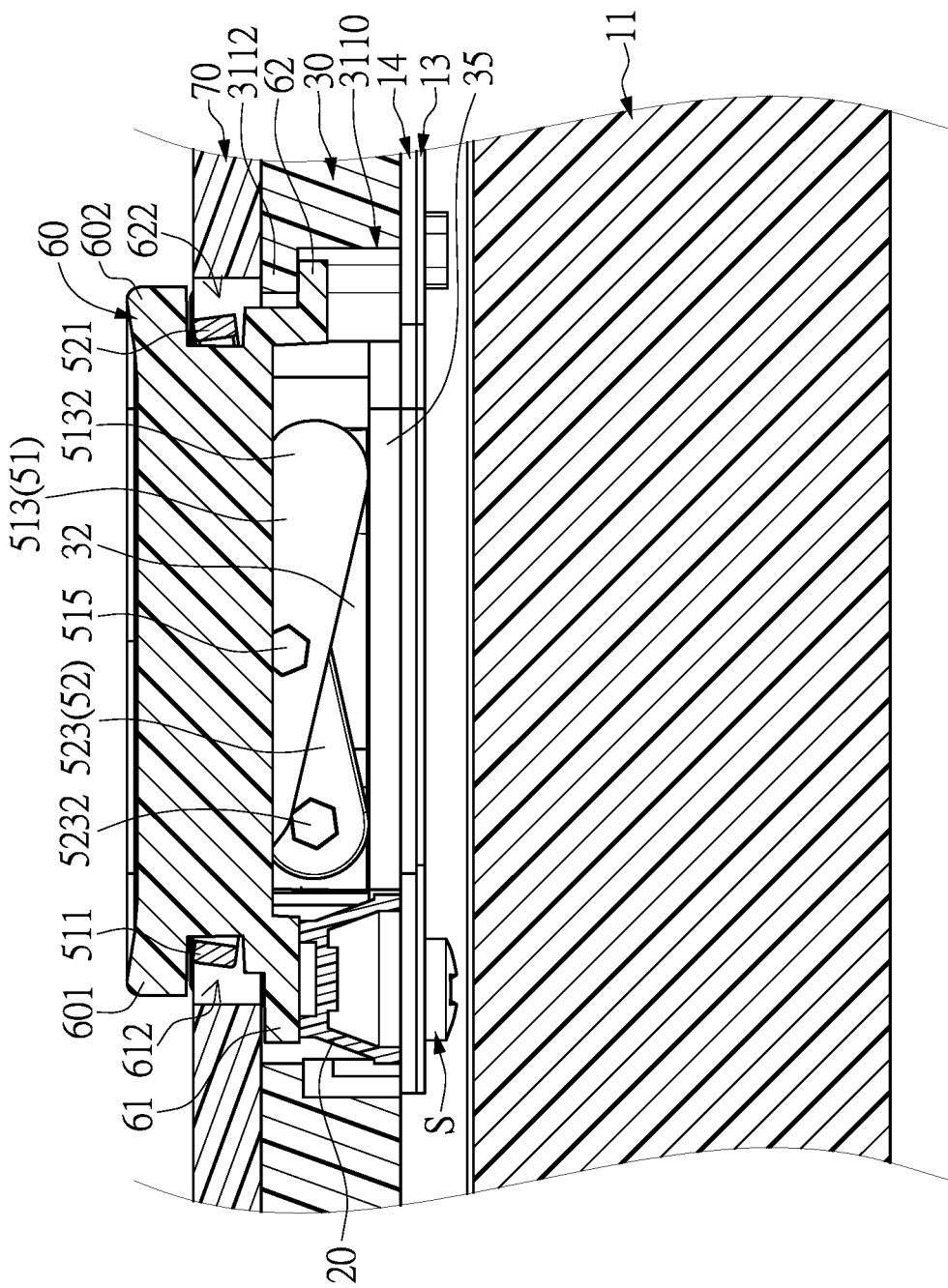
FIG. 6 is a cross-sectional view of the key structure not being pressed and along line VI-VI of FIG. 1 of the present disclosure.

The translucent keycap 60 can be made of a translucent material. A top end of the first supporting frame 51 and a top end of the second supporting frame 52 are slidably connected to two sides of the translucent keycap 60, respectively. The translucent keycap 60 includes a pressed tab 61, as shown in FIG. 4 and FIG. 6. The pressed tab 61 corresponds in position to the elastic member 20.

Figure 7:
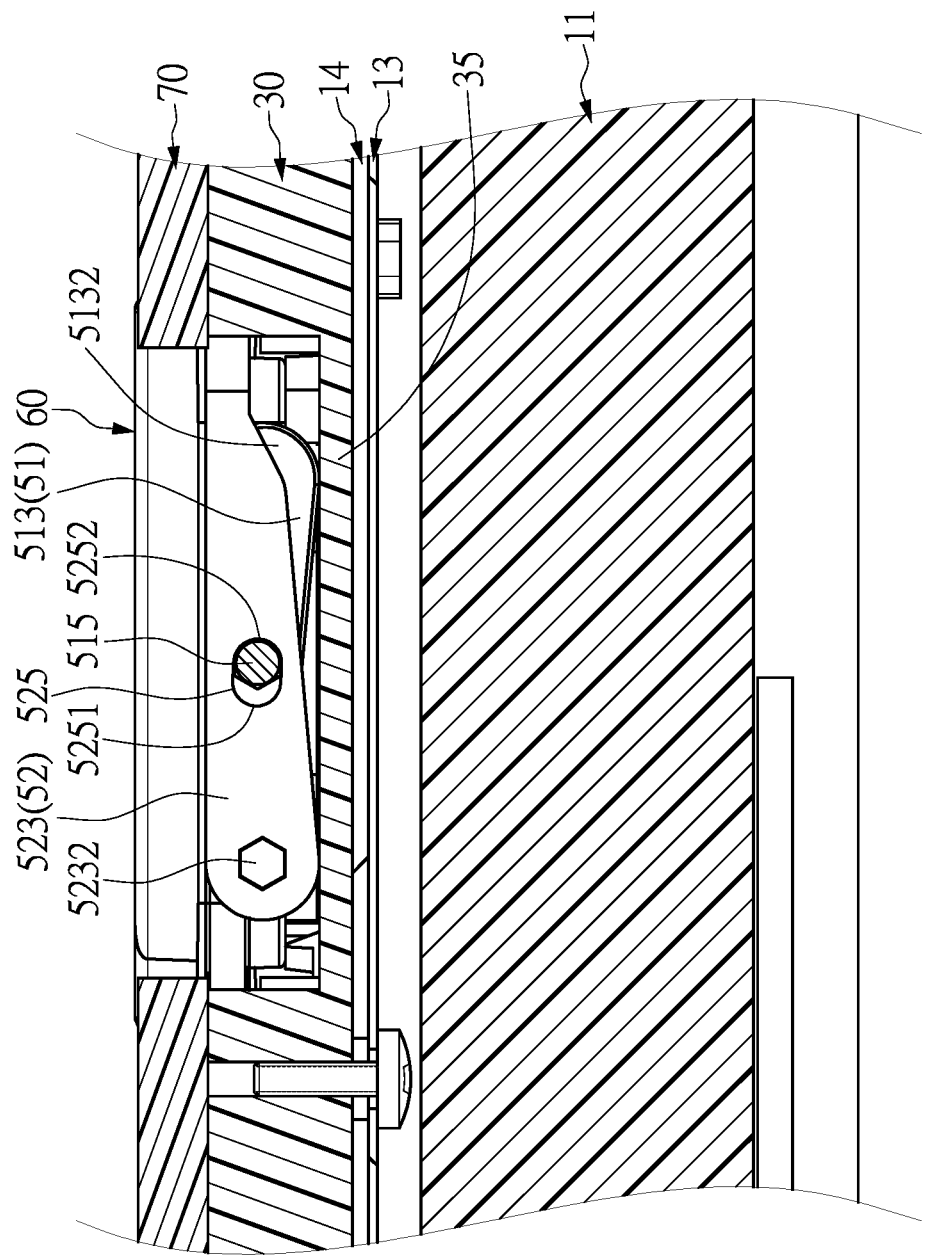
FIG. 7 is a cross-sectional view of the key structure being pressed and along line V-V of FIG. 1 of the present disclosure.

Referring to FIG. 5, when the translucent keycap 60 is in a non-pressed status, the axle portion 515 of the first arm 513 abuts against a hole-end 5251 (or called as an initial hole-end) of the linking hole 525. Referring to FIG. 7, when the translucent keycap 60 is in a pressed status, the axle portion 515 of the first arm 513 abuts against a hole-end 5252 (or called as a terminal hole-end) of the linking hole 525. In detail, the elongated direction of the linking hole 525 is not parallel to the elongated direction of the second arm 523, and the elongated direction of the linking hole 525 is substantially parallel to a bottom surface of the key seat 30 (or called as a horizontal surface). During the pressing process of the translucent keycap 60, the linking hole 525 rotates slightly with the hole-end 5251 as a center. Originally, the hole-end 5252 is slightly higher than the hole-end 5251 (as shown in FIG. 5), and then moves to a position slightly lower than the hole-end 5251 (as shown in FIG. 7). In other words, in this embodiment, during the pressing process of the translucent keycap 60, the axle portion 515 is continuously guided by the elongated-shape linking hole 525, and the translucent keycap 60 does not deflect from the first supporting frame 51 or the second supporting frame 52, so that the translucent keycap 60 can be stable and smooth without deflection during a downward keying stroke, thereby providing a better pressing tactile sensation for users. Further details of this embodiment will be introduced as follows.

As shown in FIG. 3 and FIG. 4, the accommodation portion 31 of the key seat 30 includes a front side 311, a rear side 312, and two lateral sides 313 that are opposite to each other. A conduction hole 3120 is formed on the rear side 312, and the elastic member 20 is disposed in the conduction hole 3120. A bottom of the front side 311 has a limiting recess 3110 and a blocking flange 3112 formed thereon. The blocking flange 3112 is arranged above the limiting recess 3110. Another side of the translucent keycap 60 has a limiting protrusion 62 (as shown in FIG. 3) that extends outward in a direction away from the pressed tab 61. In detail, the translucent keycap 60 has two opposite sides that are a first side 601 and a second side 602. The translucent keycap 60 has a pressed tab 61 that extends downward and outward from a bottom of the first side 601. Furthermore, the translucent keycap 60 has a limiting protrusion 62 that extends downwardly and outwardly from a bottom of the second side 602. The limiting protrusion 62 is movably disposed in the limiting recess 3110. As shown in FIG. 6, when the translucent keycap 60 is in the position of a non-pressed status, the covering lid 70 blocks the pressed tab 61 of the translucent keycap 60, and the blocking flange 3112 blocks the limiting protrusion 62, so as to limit the translucent keycap 60 in the position of the non-pressed status.

Figure 8:
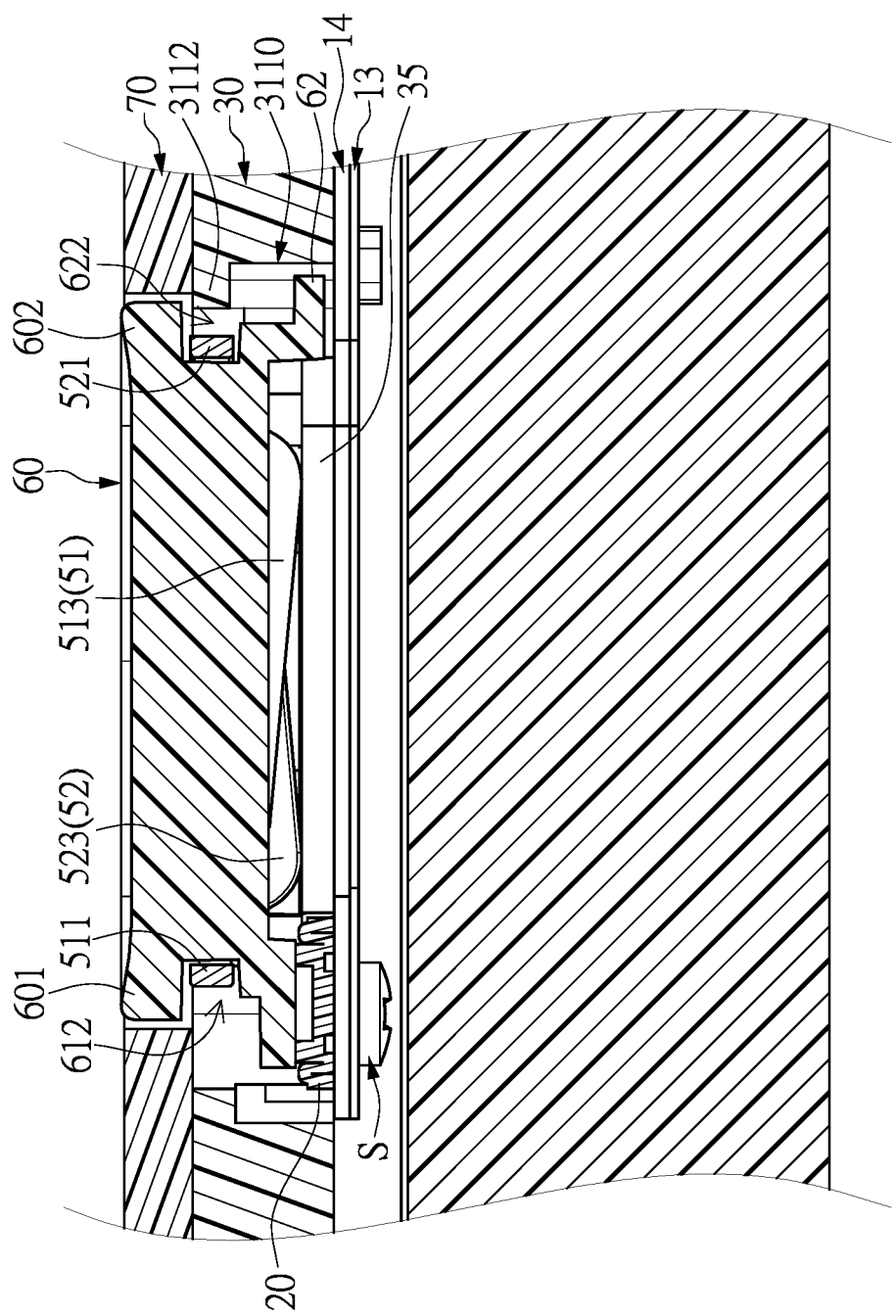
FIG. 8 is a cross-sectional view of the key structure being pressed and along line VI-VI of FIG. 1 of the present disclosure.

Reference is made to FIG. 6 and FIG. 8. The linkage relationship of the translucent keycap 60 and the supporting unit 50 is introduced as follows. A first lateral trench 612 is formed on the first side 601 of the translucent keycap 60 and arranged above the pressed tab 61, and the first traversing bar 511 is disposed in the first lateral trench 612. A second lateral trench 622 is formed on the second side 602 of the translucent keycap 60 that is opposite to the first side 601. The second lateral trench 622 is arranged above the limiting protrusion 62, and the second traversing bar 521 is disposed in the second lateral trench 622.

Reference is made to FIG. 3 and FIG. 4. The linkage relationship of the supporting unit 50 and the accommodation portion 31 is introduced as follows. The accommodation portion 31 has two sliding protrusions 35 that protrude inward from the two lateral sides 313, respectively. The bottom ends of the two first arms 513 of the first supporting frame 51 are slidably disposed on the two sliding protrusions 35, respectively. However, the present disclosure is not limited thereto. The sliding protrusion can be a bottom portion of a board member disposed under the key seat 30.

The accommodation portion 31 has two pivoting members 32 which are formed on the two lateral sides 313, respectively. Each of the pivoting members 32 has a pivoting hole 320 that opens upward formed thereon. Each of the bottom ends of the two second arms 523 of the second supporting frame 52 has a pivoting axle 5232. The pivoting axle 5232 is pivotally connected to the pivoting hole 320 of the pivoting member 32. In detail, the accommodation portion 31 has two indentions 3130 that are rectangular-shaped and formed on the two lateral sides 313, respectively. The two pivoting members 32 are disposed in the two indentions 3130, respectively. In this embodiment, the pivoting members 32 can be formed in the indentions 3130 by plastic injection. However, the present disclosure is not limited thereto. The pivoting members 32 can be formed integrally together with the accommodation portion 31 in one-piece.

An additional remark can be made to FIG. 4 and FIG. 7, in which the front side 311 and the rear side 312 of the accommodation portion 31 each have a stopper 36. When the translucent keycap 60 is pressed, the stoppers 36 can block the first supporting frame 51 and the second supporting frame 52.

However, the aforementioned details are disclosed for exemplary purposes only, and are not meant to limit the scope of the present disclosure.

Beneficial Effects of the Embodiment

In conclusion, in a conventional scissor-type mechanism of the keyboard, one top end of the supporting frames is pivotally connected to a bottom of the keycap, and another one top end of the supporting frames is slidably disposed on the bottom of the keycap. In addition, cross portions of the two supporting frames are also pivotally connected to each other. The abovementioned "pivotally" indicates a connection that only allows a rotation to be performed, and does not allow a movement relative to the keycap. If such arrangement is applied to the key structure 100 of the present disclosure, the elastic member 20 is located at one side of the translucent keycap 60, so that the elastic member 20 causes an upward elastic force to exert on one side of the translucent keycap 60 during the downward keying stroke of the translucent keycap 60. Therefore, the keycap easily rotates with a pivotally-connected position as a fulcrum, and the keycap is easily titled and not smooth.

In conclusion, in the key structure 100 of the present disclosure, which is capable of displaying an instant image, by virtue of "a top end of the first supporting frame and a top end of the second supporting frame being slidably connected to two sides of the translucent keycap," the translucent keycap can be prevented from tilting caused by rotation. In addition, by virtue of "the linking hole being elongated-shaped with two hole-ends", "the two axle portions of each of the first arms being slidably disposed in the two linking holes of the second arms, respectively", and "a width of each of the linking holes along an elongated direction of each of the second arms being larger than a height of each of the linking holes along a direction perpendicular to the elongated direction of each of the second arms," when the translucent keycap is pressed in a downward keying stroke, the elongated-shaped linking hole can allow the first arms to smoothly slide in a lateral direction and gradually be lowered down, so that the translucent keycap is stably supported in the downward keying stroke. Therefore, a stable and non-tilted pressing tactile feeling can be provided for users.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A key structure capable of displaying an instant image, comprising:
    a display unit;
    a key seat disposed above the display unit and forming an accommodation portion that is hollow;
    a first supporting frame having two first arms and two axle portions, wherein each of the first arms has one of the axle portions, and each of the first arms has a bottom end slidably disposed on the accommodation portion;
    a second supporting frame having two second arms and two linking holes, and the second supporting frame and the first supporting frame being arranged in a crossed manner; wherein each of the second arms has one of the linking holes formed thereon, and each of the second arms has a bottom end pivotally connected to the accommodation portion; wherein each of the linking holes is elongated-shaped and has two hole-ends, and the two axle portions of the first arms are slidably disposed in the two linking holes, respectively; wherein a width of each of the linking holes along an elongated direction of each of the second arms is larger than a height of each of the linking holes along a direction perpendicular to the elongated direction of each of the second arms;
    a translucent keycap, wherein a top end of the first supporting frame and a top end of the second supporting frame are slidably connected to two sides of the translucent keycap, respectively; wherein an image information of the display unit is shown through the accommodation portion and the translucent keycap so as to be shown outside;
    a circuit membrane disposed above the display unit; and an elastic member disposed on the circuit membrane;
wherein the elastic member is adjacent to one side of the accommodation portion, and a pressed tab that corresponds in position to the elastic member is formed on one side of the translucent keycap, and wherein the circuit membrane has a conductive portion, and the elastic member abuts against the conductive portion;
wherein, when the translucent keycap is not pressed, the two axle portions of the first arms each abut against one of the two hole-ends of each of the linking holes, respectively; wherein, when the translucent keycap is pressed, the two axle portions of the first arms each abut against the other one of the two hole-ends of each of the linking holes;
wherein the accommodation portion of the key seat has a front side, a rear side, and two lateral sides that are opposite to each other, wherein a conduction hole is formed on the rear side, and the elastic member is disposed in the conduction hole, wherein the accommodation portion has a limiting recess and a blocking flange that are formed on a bottom of the front side, the blocking flange is formed above the limiting recess, and wherein another side of the translucent keycap has a limiting protrusion that extends outward in a direction away from the pressed tab, and the limiting protrusion is movably disposed in the limiting recess.

2. The key structure according to claim 1, wherein the accommodation portion has two sliding protrusions that protrude inward from the two lateral sides, respectively, wherein the bottom ends of the two first arms of the first supporting frame are slidably disposed on the two sliding protrusions, respectively.

3. The key structure according to claim 2, wherein the first supporting frame has a first traversing bar, the two first arms are connected to two ends of the first traversing bar, respectively, wherein a first lateral trench is formed on a first side of the translucent keycap and above the pressed tab, and the first traversing bar is disposed in the first lateral trench.

4. The key structure according to claim 3, wherein the accommodation portion has two pivoting members formed on the two lateral sides, respectively, wherein each of the pivoting members has a pivoting hole that opens upward formed thereon, each of the bottom ends of the two second arms of the second supporting frame has a pivoting axle pivotally connected to the pivoting hole.

5. The key structure according to claim 4, wherein the accommodation portion has two indentions formed on the two lateral sides, respectively, and the two pivoting members are disposed in the two indentions, respectively.

6. The key structure according to claim 5, wherein the second supporting frame has a second traversing bar, the two second arms are connected to two ends of the second traversing bar, respectively, wherein a second side of the translucent keycap is opposite to the first side and has a second lateral trench formed thereon, the second lateral trench is formed above the limiting protrusion, and the second traversing bar is disposed in the second lateral trench.

7. The key structure according to claim 1, wherein the front side and the rear side of the accommodation portion each have at least one stopper, and wherein, when the translucent keycap is pressed, the stoppers block the first supporting frame and the second supporting frame.

8. A keyboard having at least one key structure capable of displaying an instant image, wherein each of the at least one key structure comprises:
a display unit;
a key seat disposed above the display unit and forming an accommodation portion that is hollow;
a first supporting frame having two first arms and two axle portions, wherein each of the first arms has one of the axle portions, and each of the first arms has a bottom end slidably disposed on the accommodation portion;
a second supporting frame having two second arms and two linking holes, and the second supporting frame and the first supporting frame being arranged in a crossed manner; wherein each of the second arms has one of the linking holes formed thereon, each of the second arms has a bottom end pivotally connected to the accommodation portion; wherein each of the linking holes is elongated-shaped and has two hole-ends, and the two axle portions of the first arms are slidably disposed in the two linking holes respectively; wherein a width of each of the linking holes along an elongated direction of each of the second arms is larger than a height of each of the linking holes along a direction perpendicular to the elongated direction of each of the second arms;
a translucent keycap, wherein a top end of the first supporting frame and a top end of the second supporting frame are slidably connected to two sides of the translucent keycap, respectively; wherein an image information of the display unit is shown through the accommodation portion and the translucent keycap so as to be shown outside;
a circuit membrane disposed above the display unit; and
an elastic member disposed on the circuit membrane;
wherein the elastic member is adjacent to one side of the accommodation portion, and a pressed tab that corresponds in position to the elastic member is formed on one side of the translucent keycap, and wherein the circuit membrane has a conductive portion, and the elastic member abuts against the conductive portion;
wherein, when the translucent keycap is not pressed, the two axle portions of the first arms each abut against one of the two hole-ends of each of the linking holes, respectively; wherein, when the translucent keycap is pressed, the two axle portions of the first arms each abut against the other one of the two hole-ends of each of the linking holes;
wherein the accommodation portion of the key seat has a front side, a rear side, and two lateral sides that are opposite to each other, wherein a conduction hole is formed on the rear side, and the elastic member is disposed in the conduction hole, wherein the accommodation portion has a limiting recess and a blocking flange that are formed on a bottom of the front side, the blocking flange is formed above the limiting recess, and wherein another side of the translucent keycap has a limiting protrusion that extends outward in a direction away from the pressed tab, and the limiting protrusion is movably disposed in the limiting recess.

* * * * *